Figure 4:
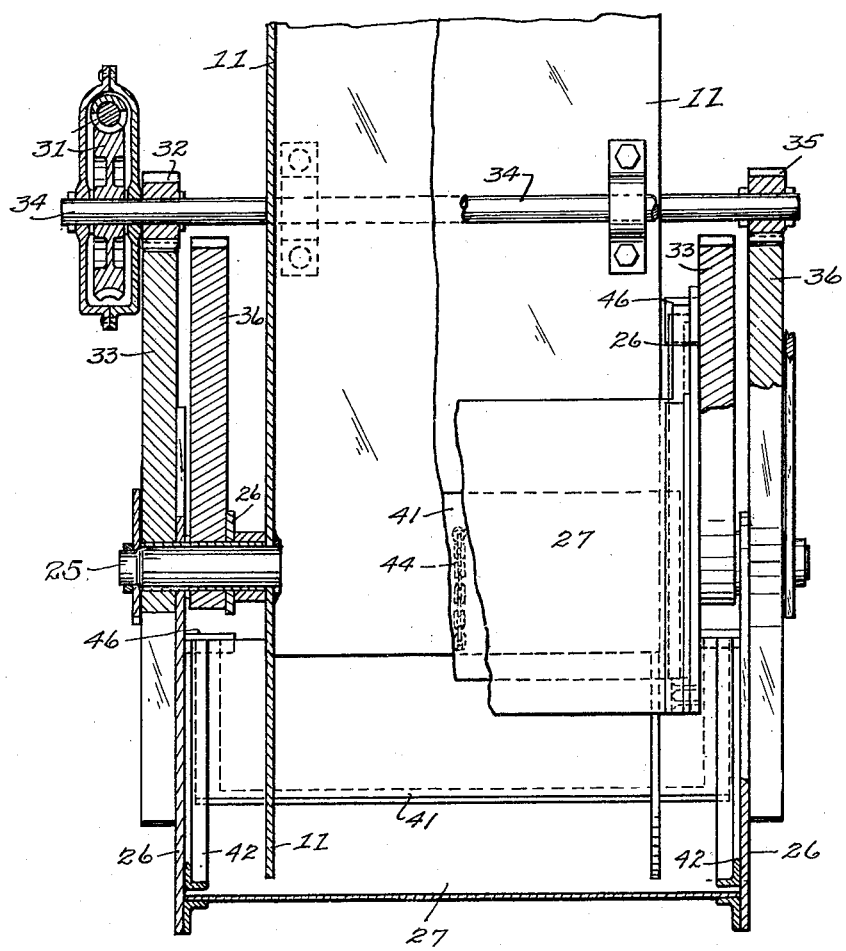

Sept. 13, 1932.  R. W. KALTENBACH  1,876,685
GATE FOR MATERIAL CONVEYING CHUTES
Filed March 9, 1931  3 Sheets-Sheet 1
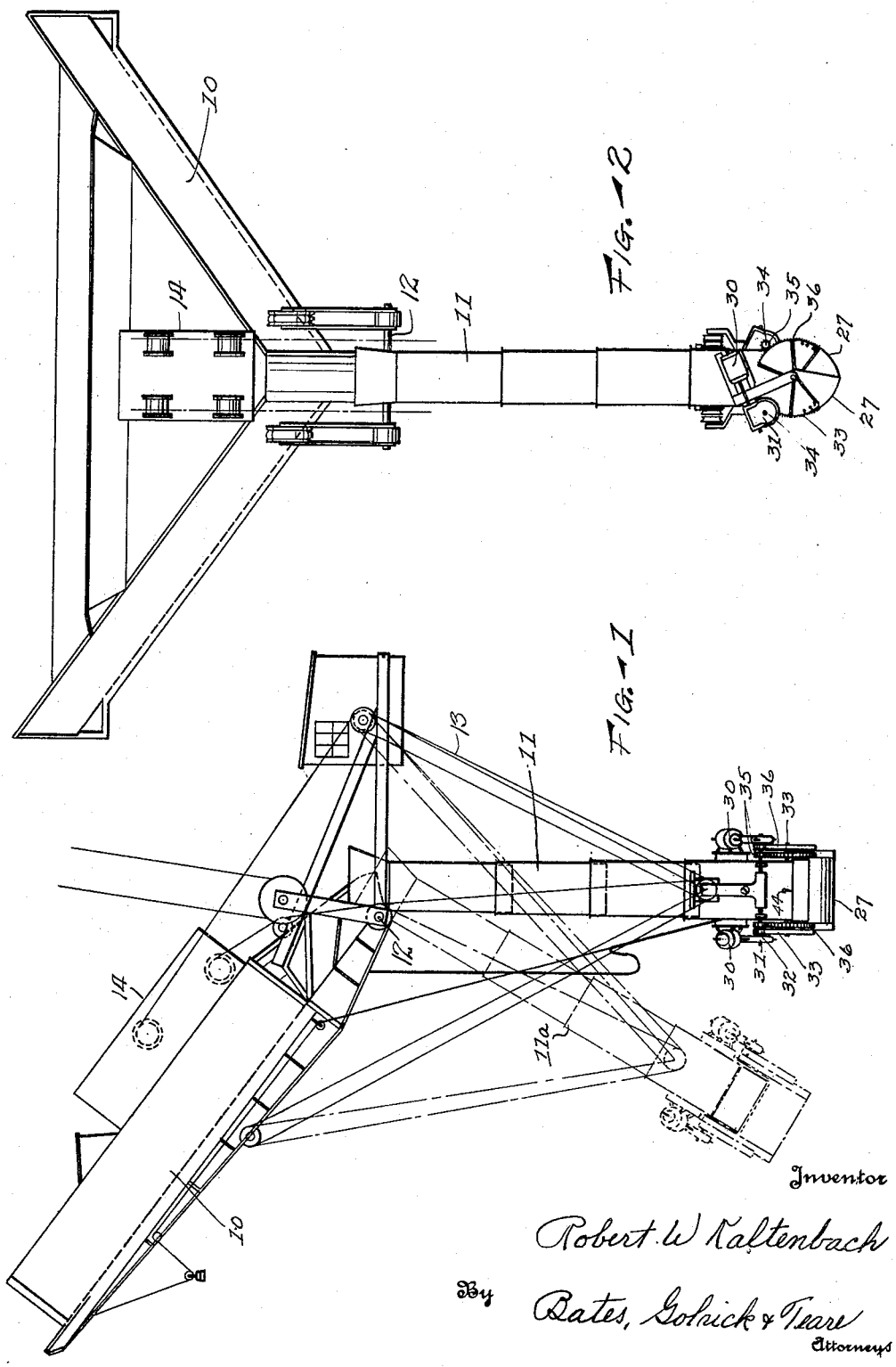

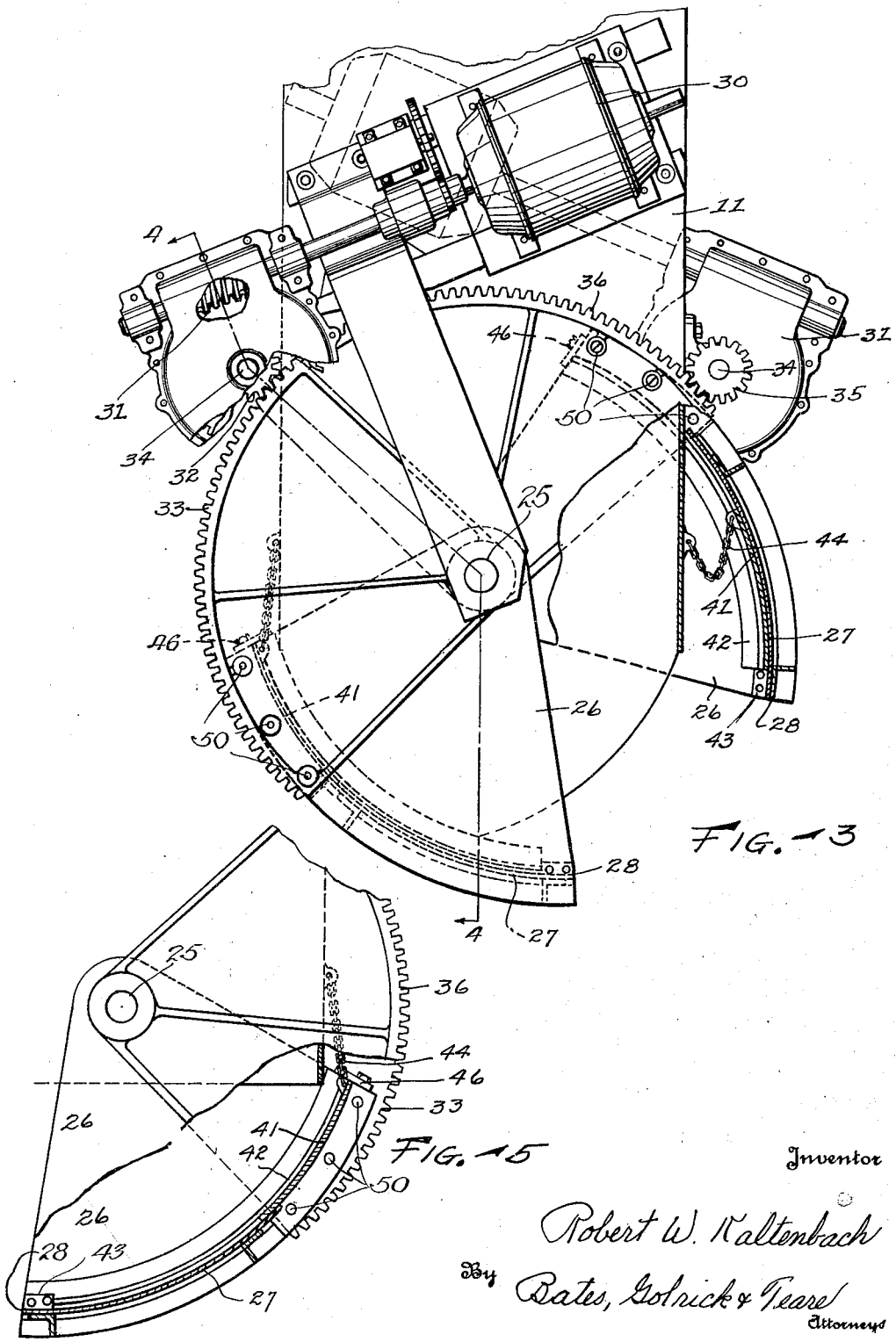

Patented Sept. 13, 1932

1,876,685

UNITED STATES PATENT OFFICE

ROBERT W. KALTENBACH, OF CLEVELAND HEIGHTS, OHIO

GATE FOR MATERIAL CONVEYING CHUTES

Application filed March 9, 1931. Serial No. 521,063.

This invention relates to means for controlling and directing the flow of material from a discharge chute, and particularly from those which extend downwardly from the end of a conveyor or pan on a car dumper or trestle unloader. When such apparatus is used for loading ocean going vessels, it is necessary to use a power actuated belt trimmer adjacent the bottom of the chute for distributing the load uniformly beneath the decks. Vessels that ply on the Great Lakes, however, usually have the hatches extending across the entire width of the vessel, so that the sides can be trimmed merely by tilting the chute. Such procedure, however, is inadequate for trimming the vessel in a fore and aft direction to fill the space between adjacent hatches. It is desirable, however, to provide a fore and aft trimmer, but a belt trimmer is objectionable for it is expensive to install and operate. Furthermore, as it is cumbersome, it increases the difficulty of manipulating the chute, particularly as it adds greatly to the weight at the most remote point from the chute pivot. It is also desirable to provide a trimmer, which will operate satisfactorily on ocean going vessels without necessity for the use of a belt trimmer.

A further consideration in connection with the dumping of coal is the fact that breakage occurs whenever it is allowed to drop down the pan and chute and into the hold of the vessel with a falling, rather than a sliding action. Ordinarily, the pan holds from one to two carloads of coal and acts as a reservoir to maintain a continuous load within the chute, notwithstanding the fact that the cars are brought intermittently to the unloader. Delays in car movement, however, frequently occur, with the result that the pan and chute are emptied before the next loaded car is available for dumping into the pan. This causes the load to fall, rather than slide through the pan and chute, and results in considerable breakage, which materially lessens the value of the coal. Again, in changing the chute from one to another hatch of the vessel, the practice has been to hold the car at the top of the pan until the contents of the pan and chute have been emptied into one hatch. Then the chute is raised and transferred to another hatch and lowered to the bottom of the vessel, whereupon the car is tipped farther to start the coal again down the pan and chute, and into the hatch.

Thus, the flow of coal has been controlled by the manipulation of the car, as it has been considered impractical to utilize a gate in conjunction with a belt trimmer. This practice, however, materially decreases the speed at which cars may be unloaded, for it necessitates a holding of the car on the unloading platform in accordance with the loading requirements at different points of the vessel. Furthermore, this operation causes breakage not only at each intermittent dropping of the coal from the car into the pan, but also at the time the fall of coal into the hatch is arrested.

The principal object of the present invention, therefore, is to eliminate, as far as possible, the objectionable breakage of coal, by providing apparatus by means of which the coal may be discharged into vessels by a sliding action, rather than by a dropping action. In addition, my invention is concerned with the provision of apparatus which is well adapted for trimming coal not only on ocean going vessels, but also on those that ply upon the Great Lakes.

I accomplish these objects by providing a gate at the bottom of the chute, and by so mounting it thereon that it may be adapted for trimming the coal in a fore and aft direction. Heretofore, the proposal has been made of utilizing a gate that comprises a pair of curved members, and that are mounted on spaced pivots adjacent the bottom of the chute. The separation of the pivotal connections was necessary to provide adequate clearance against the back of the chute without restricting the size of the discharge opening when one of the members, or both, are moved to the full open position. This method of mounting, however, has made the members impractical to perform the trimming action, for they cannot be swung downwardly sufficiently far beyond the center to trim the load, without creating an opening at the back of the gate that permits the flow of coal therethrough, rather than through the discharge point of the gate. I overcome this difficulty and obtain a practical trimmer by mounting the members upon a common pivot, and providing a telescopic bottom which enables them to be moved to the full open position without restricting the discharge opening, and yet to be swung downwardly beyond the center of the chute, so that adequate lateral movement can be imparted to the material to trim the load without uncovering the back edge of the gate.

Referring now to the drawings, Fig. 1 is a side elevation of a chute embodying my invention; Fig. 2 is a front elevation of the device shown in Fig. 1; Fig. 3 is a side elevation, partly in section, on an enlarged scale of the mechanism adjacent the lower end of the chute; Fig. 4 is a side elevation, partly in section, on the line 4—4 in Fig. 3; and Fig. 5 is a side elevation of one of the gates showing part of it in section.

My invention, as heretofore stated, is adapted to be used in connection with a lifting or tilting car dumper and also in connection with a trestle type of unloader, and so in the drawings, I have illustrated a pan 10, which may be utilized in connection with either type of unloader. A chute 11 extends downwardly from the pan and is adapted to be swung about the pivot 12 through the operation of cables 13, which in turn are actuated by a mechanism 14 that is housed upon the pan. One of the positions of the chute is shown by the full lines in Fig. 1 and another position by the broken lines 11a.

I propose to provide a gate at the end of the chute and to manipulate the gate so as to maintain the chute substantially filled with material notwithstanding the amount which is held in the pan. Normally, the pan has a capacity of one to two carloads, so as to permit the continuous flow into the vessel while allowing sufficient time for removing an empty car and bringing a loaded one onto the tilting or car receiving platform. To this end, I provide a gate at the bottom of the chute that is adapted to be closed, regardless of the position of the chute with reference to the pan and regardless of the direction in which the material is being discharged from the chute.

I carry out my method by utilizing a pair of clam shell bucket jaws that extend around opposite sides of the chute and that are mounted upon a common pivot 25 adjacent the midportion of the chute. Each jaw, therefore, comprises a U-shaped member, having vertical side portions 26 and a curved bottom 27. The bottom is telescopic so as to permit an unobstructed discharge from the chute whenever each gate is moved to the full open position. Furthermore, the forward edge 28 of each jaw is adapted to overhang the axis of the pivot so that the material is caused to move at right angles to the chute, as it leaves the gate. This feature is quite important, for it enables the gates to be attached to chutes regardless of the cross sectional shape thereof, and yet permits the bottom of the gate to be curved to conform to the edge of the chute.

To move each gate, I provide an electric motor 30, which is mounted on the side of the chute above the gate, and which is connected by suitable gearing 31 to a pinion 32, which in turn is adapted to mesh with a circular segmental gear 33, which is an extension of the side wall 26 of the gate and connected thereto by fastening devices 50. The pinion shaft 34 extends across the chute on the outerside thereof, and carries a second pinion 35, which in turn is adapted to mesh with another circular segmental gear 36 that is disposed on the side of the chute opposite the gear 33. Thus, each gate has two gears that are positioned on opposite sides of the chute, so that load and operating stresses are equalized on the bearings.

As shown in Fig. 3, I mount a motor on one side of the chute for operating one of the gates, and a corresponding mechanism on the opposite side of the chute for operating the other gate. Thus, each gate may be controlled independently of the other, and yet both may be operated simultaneously. To permit adequate clearance when the gates are opened, I have provided a telescopic bottom, as heretofore stated, on each gate. To this end, each bottom comprises a stationary member 27 which is rigidly fastened to the sides 26 of the gate and a relatively movable member 41, having no side portions, which is slidably mounted upon the member 27 in curved guides 42, that extend along the vertical side portions 26 of each gate. A suitable stop 43 at the forward end holds the movable member in place when the gate is open. A chain 44, having one end thereof fixed to the chute 11, and the other end to the member 41, limits the downward movement of the movable member when the gate is moved to the closed or trimming position as shown in Fig. 5. In Fig. 3, the inside gate member is shown as having the bottom in extended position, and during such movement, the movable member 41 is forced downwardly by an upper stop 46, unless it falls by gravity during the opening movement of the gate Fig. 3 also shows how the forward edge 28 of the gate overhangs the axis of pivot 25, being forced to that position by the segmental gear 33.

As shown in Fig. 1, the chute is adapted to be swung crosswise of a vessel, and so the gates are mounted to be swung at right angles to the plane of such motion. Thus, the load may be trimmed in a fore and aft direction without the necessity for the use of a power actuated belt trimmer.

I claim:

1. In combination, a material conveying chute, a pair of closure members mounted on the chute, adjacent the bottom portions thereof, each closure member comprising telescopic sections.

2. In combination a material conveying chute, and a pair of clam shell bucket gates mounted on a common pivot at the bottom of the chute, each gate comprising telescopic sections.

3. In combination, a material conveying chute and a closure for the bottom thereof, said closure comprising a pair of clam shell jaws mounted on a common pivot and means mounted on the chute for operating each jaw independently of the other.

4. In combination, a material conveying chute having a pair of closure gates mounted on a common pivot adjacent the bottom of the chute, means for operating each gate independently of the other, each gate, when in the lowermost position, having a bottom of such length that the forward edge of the gate overhangs the center of the chute, whereby the vessel into which the material is being deposited may be trimmed by the position of the closure member.

5. In combination, a material conveying chute, a pair of clam shell closure members mounted on a common pivot adjacent the bottom of the chute, an electric motor mounted on the chute for operating each member independently of the other, the bottom of each member having such length that when the rearmost edge is adjacent the corner of the chute, the foremost edge is beyond the vertical plane of the pivot whereby the vessel may be trimmed by each member independently of the other.

6. A closure for a material conveying chute, comprising a pair of members, pivotally mounted on the chute adjacent the bottom thereof, at least one of said members having a telescopic bottom, and means mounted on the chute for operating said members.

7. In combination, a material conveying chute, a pair of clam shell closure members mounted on a common pivot adjacent the lower end of the chute, the axis of the pivot extending through substantially the midportion of the chute, and the bottom of said members being telescopic.

8. In combination, a material conveying chute, a pair of oscillatable closure members mounted on a common pivot adjacent the bottom of the chute, means for rotating either member to either side of the pivot, said means for effecting a closure when the meeting edges of said members occupy any one of different positions within predetermined limits on opposite sides of the pivot.

9. A closure for a material conveying chute, comprising a pair of clam-shell jaws pivotally mounted on the lower portion of the chute, the bottom of each jaw having such length that when the jaw is swung about the pivot, the forward edge thereof extends beyond a vertical plane passing through the axis of the pivot.

10. A closure for a material conveying chute comprising a pair of clam shell jaw members pivotally mounted on a chute adjacent the bottom thereof, each of said members having rigid sides and a telescopic bottom.

11. In combination, a material conveying chute, means adjacent the bottom of the chute for controlling the flow of material therefrom, said means comprising a pair of coacting jaws mounted on a common pivot, the bottom of each jaw having such length that when the jaw is swung about the pivot the foreward end of each jaw extends beyond a vertical plane passing through the axis of the pivot, and an electric motor mounted on the chute for operating each jaw independently of the other.

12. In combination, a material conveying chute, a trimmer adjacent the bottom thereof, said trimmer comprising a curved member pivotally mounted adjacent the bottom of the chute, and having the bottom thereof projecting beyond a plane that extends vertically through the axis of the pivot.

13. A trimmer for a material conveying chute, comprising a member that straddles the chute and is pivotally mounted adjacent the midportion thereof, said member having a curved bottom and means on the chute for operating the member, said member having a bottom of such length that when the member is swung downwardly about the pivot the forward edge thereof overhangs the vertical center of the chute.

14. In combination, a material conveying chute, a pair of U-shaped closure members mounted on a common pivot adjacent the bottom of the chute, a segmental gear rigidly connected to each closure member, electric motors mounted on opposite sides of the chute and above the gears, and means for connecting each motor to one of said gears, said motors being independently operable, whereby the movement of the members may be independently controlled.

In testimony whereof, I hereunto affix my signature.

ROBERT W. KALTENBACH.